UNITED STATES PATENT OFFICE.

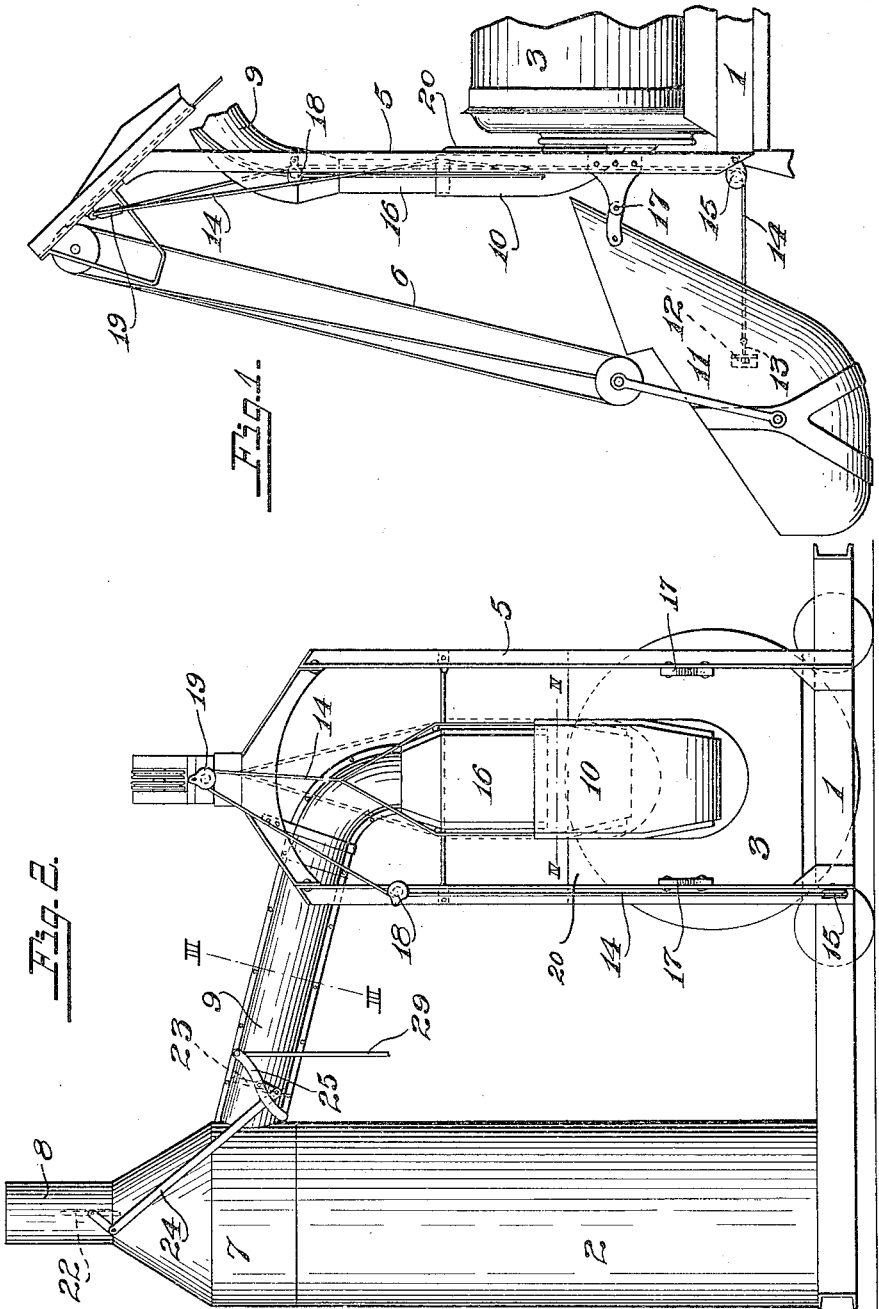

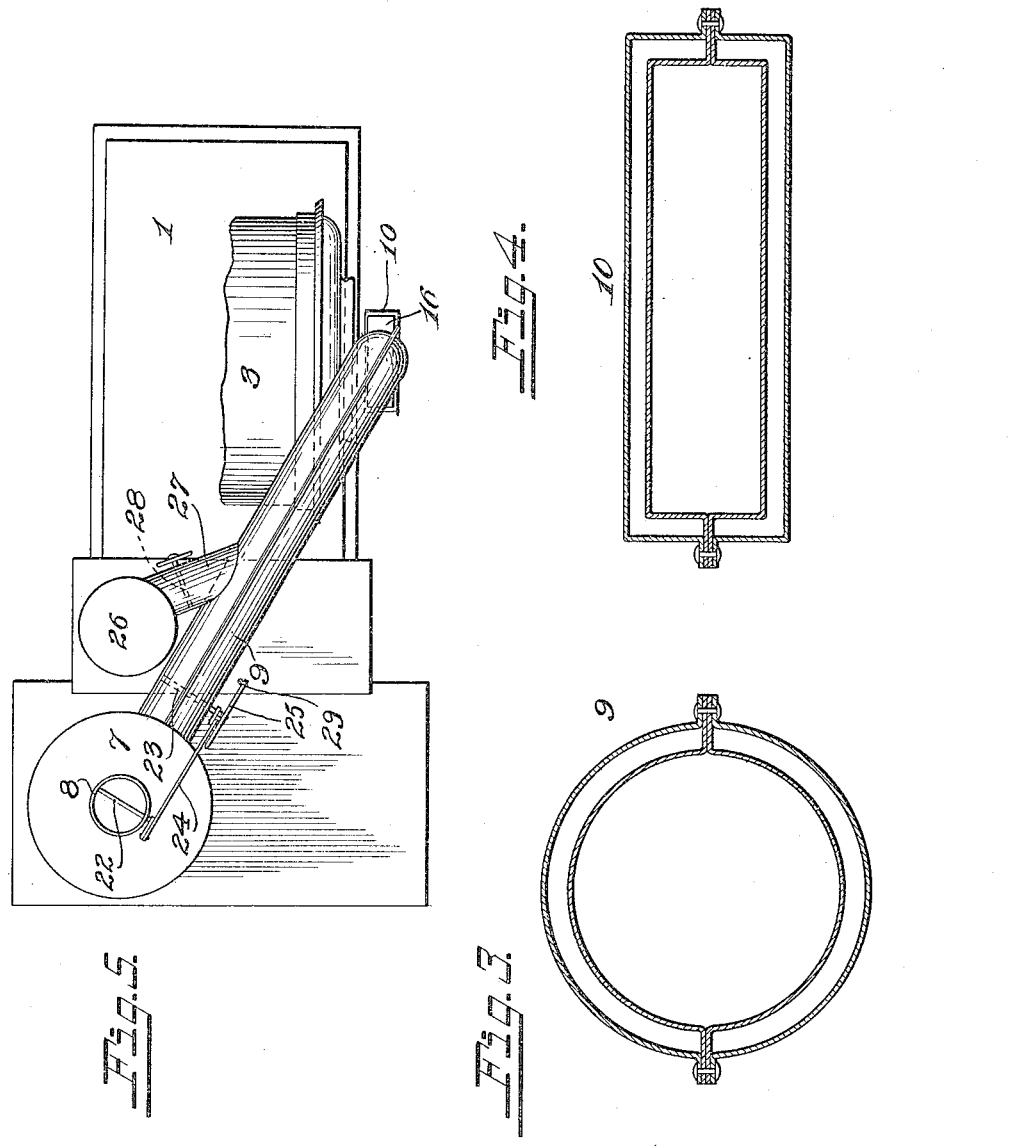

CHRISTOPHER W. LEVALLEY, OF MILWAUKEE, WISCONSIN.

MACHINE FOR HEATING AND MIXING MATERIALS.

1,123,901.     Specification of Letters Patent.     Patented Jan. 5, 1915.

Application filed January 31, 1914. Serial No. 815,751.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Machines for Heating and Mixing Materials, of which the following is a specification.

My invention relates to a machine for mixing materials in a highly heated atmosphere, being designed with especial reference to mixing such materials as are employed in making asphalt and bituminous pavements.

In the accompanying drawings—Figure 1 is a side view of an apparatus embodying my invention. Fig. 2 is a front view. Figs. 3 and 4 are cross sectional views of the conduit for the hot gases, taken respectively on the lines III—III and IV—IV of Fig. 2. Fig. 5 is a top plan view of apparatus embodying the invention, the mixing machine being broken away.

Referring to these drawings, 1 designates a supporting frame which is preferably a wheel-mounted portable truck. Upon this are supported a steam boiler 2 and a rotary mixing drum 3. This drum is driven by a motor, not shown in the drawings, that may be supplied with steam from the boiler 2. The form of mixing drum is largely immaterial, my invention being adapted to be used in connection with a wide variety of such devices.

For purposes of illustration I have selected the mixing drum and appurtenant apparatus shown in my Patent 1,067,041 of July 8, 1913, for concrete mixer. This drum is provided at its ends with openings, through one of which the material to be treated is fed, and through the other of which it is discharged. A tilting loader 11, pivoted at 17 to brackets extending forward from the upright framework 5 arranged at the feed end of the machine, is employed to receive the material to be operated upon and deliver it into the mixing drum. The loader is arranged to be operated by a cable 6, as described in my aforesaid patent.

A canopy 7 surmounts the boiler 3 and receives the products of combustion and heated gases from the furnace of the boiler. The usual stack 8 normally conducts the gases away from the canopy for discharge into the open air. A conduit 9 communicates with the canopy 7 and is adapted to receive the heated gases from the boiler and deliver them into the drum 3 in order to produce a highly heated atmosphere therein in which the mixing operations may take place. The conduit 9 is preferably double-walled, as indicated in Fig. 3, to prevent loss of heat by radiation.

22 indicates a valve in the stack 8, and 23 a similar valve in the conduit 9. By means of these the flow of hot gases from the boiler is controlled. The two valves are connected by a link 24, and are so set that when one is open the other is closed. An operating lever 25 and a pull rod or cord 29 connected with such lever, are employed to control the positions of the valves.

The end of the conduit, 9, that communicates with the drum is telescopic, having an adjustable section 10 that is adapted to be moved so as to cover the feed opening of the drum, or to be raised to uncover said opening, when it will slide over the stationary telescoping section 16. These telescoping portions of the conduit are preferably rectangular in cross section, as indicated in Fig. 4, and, like the rest of the conduit, may be double-walled. By making the telescoping portion of the conduit rectangular as described and shown, several advantages are secured: In the first place it makes it easy to provide a flat face that registers with the feed end of the mixing machine 3; and in the next place this arrangement prevents any twisting or rotative movements of the sections relative to each other, and hence insures that the movable section shall follow a definite path and always come into exact registry with the end of the mixing drum. The section 10 of the conduit moves just in front, or outside, of the stationary guard plate 20 that is customarily employed at the feed end of the drum between it and the loader 11. The outer end of the conduit, that is, the end adjacent to the mixing drum, is supported by the framework 5 in any suitable workmanlike manner, as indicated at 21.

14 is a cable connected at one end with the movable section 10 of the conduit, and at its other end with the loader, 11. It passes upwardly from the conduit section 10 to a guide pulley 19 in the head frame of the apparatus, and thence downwardly past the guiding and direction pulleys 18 and 15, the latter preferably being in the lower part of the framework 5. The cable is connected in any suitable manner with the loader, a convenient arrangement for this purpose being an angle plate 12 secured to the side of the loader and perforated to receive an adjusting or tension screw 13 to which the cable 14 is secured. By means of the tension device 13 the position of the movable section can be accurately adjusted.

It will be seen from the foregoing description and an examination of the drawings, that when the loader is lowered into the position indicated in Fig. 1, the cable 14 will be slackened or moved so as to allow the conduit section 10 to descend and cover the receiving opening into the drum 3; this movable section being provided with a delivery opening in that face which is toward the mixing drum, and that accurately registers with the feed opening into the drum when the parts are in the position just mentioned. When the loader is tilted to discharge its contents into the drum the cable 14 is, by the movements of the loader, drawn or moved so as to lift the section 10 of the conduit, uncovering the feed opening so that the loader may freely discharge into the drum. It will be seen by reference to the drawings, that the end of the movable section of the conduit, when lowered, passes the end of the loader; and in order to allow the parts to act without interfering with one another, the end of the section 10 toward the loader tapers downwardly.

It will be understood that the valve 23 should be closed and the valve 22 opened whenever the loader is operated to charge the drum, thus cutting off the delivery of gases to the conduit 9, as they would be objectionable and perhaps dangerous to the attendants operating the machine if allowed to escape when the adjustable section of the conduit is removed from the feed end of the drum.

26 indicates an auxiliary heater that is connected with conduit 9 by a flue 27 in which is located a regulating damper 28. This auxiliary heater can be used in case the boiler 3 is not operating.

What I claim is:—

1. The combination of a receptacle having a feed opening, a conduit through which hot gases are delivered to the said receptacle, having a movable section that is adapted to register with the feed opening to the receptacle, a loader for delivering material to the receptacle through the feed opening, and connections between the loader and the said movable section of the conduit arranged to move the latter from the feed opening when the loader is operated to deliver.

2. The combination of a rotatable mixing receptacle having a feed opening, a loader for delivering material thereto, a conduit through which hot gases are delivered to the receptacle having a telescoping end section that is adapted to register with the feed opening of the said rotating receptacle, and connections between the movable telescopic section of the conduit and the loader arranged to move the said section when the loader is operated to deliver to the receptacle.

3. The combination of a mixing receptacle having a feed opening, a conduit through which hot gases are delivered to the said receptacle, having a telescopic portion rectangular in cross section, the outer member of said section being adjustable and adapted to be moved, so as to either cover the feed opening or to expose the same, independently of the movements of the receptacle.

4. The combination of a rotating mixing receptacle, having a feed opening, a tilting loader for delivering material through said opening into the receptacle, a conduit for heated gases having a telescopic section at its end, the movable member of which is adapted to cover the said feed opening of the mixing receptacle in order to deliver hot gases thereto, or to be moved to a position uncovering the said opening, and cable connections between the loader and movable telescopic section of the conduit arranged to cause the said section to be moved to uncover the feed opening when the loader is tilted to deliver into the receptacle, and to cover the feed opening when the loader is moved to inactive position.

CHRISTOPHER W. LEVALLEY.

Witnesses:
C. F. MESSINGER,
H. D. KENNEDY.

Copies of this patent may be obtained for five cents each, by addressing the "Commissioner of Patents, Washington, D. C."